(12) United States Patent
Yang et al.

(10) Patent No.: US 10,110,644 B2
(45) Date of Patent: Oct. 23, 2018

(54) METHODS AND APPARATUS FOR DEDICATED BEARER ESTABLISHMENT HANDLING DURING CALL SETUP FOR LTE

(71) Applicant: QUALCOMM Incorporated, San Diego, CA (US)

(72) Inventors: Ming Yang, San Diego, CA (US); Hui Zhao, San Diego, CA (US); Srinivasan Balasubramanian, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 196 days.

(21) Appl. No.: 15/148,741

(22) Filed: May 6, 2016

(65) Prior Publication Data

US 2017/0237783 A1 Aug. 17, 2017

Related U.S. Application Data

(60) Provisional application No. 62/296,576, filed on Feb. 17, 2016.

(51) Int. Cl.
*H04W 4/00* (2018.01)
*H04L 29/06* (2006.01)
(Continued)

(52) U.S. Cl.
CPC ...... *H04L 65/1083* (2013.01); *H04L 65/1016* (2013.01); *H04W 24/10* (2013.01);
(Continued)

(58) Field of Classification Search
CPC .......... H04L 65/1083; H04L 65/1016; H04W 76/02; H04W 36/0005; H04W 36/08;
(Continued)

(56) References Cited

U.S. PATENT DOCUMENTS

2007/0019572 A1* 1/2007 Yoshida ............ H04L 29/06027
370/261
2009/0003276 A1* 1/2009 Mutikainen ........... H04W 48/18
370/329
(Continued)

FOREIGN PATENT DOCUMENTS

KR 20150045212 A 4/2015

OTHER PUBLICATIONS

CATT: "Consideration on Priority of MDT Report", 3GPP Draft, R2-1 00074, Consideration on Priority of MDT Report, 3rd Generation Partnership Project (3GPP), Mobile Competence Centre, 650, Route Des Lucioles, F-06921 Sophia-Antipolis Cedex, France, val. RAN WG2, no. Valencia, Spain, Jan. 18, 2010, Jan. 11, 2010 (Jan. 11, 2010), XP050420809, [retrieved on Jan. 11, 2010].
(Continued)

*Primary Examiner* — Clemence S Han
(74) *Attorney, Agent, or Firm* — Patterson & Sheridan, L.L.P

(57) ABSTRACT

Aspects relate to methods and apparatus for dedicated bearer (DB) establishment handling during call setup for long term evolution. According to aspects, a method is provided herein for wireless communications that may be performed, for example, by a user equipment (UE). The method generally includes establishing a connection with a first access point (AP) to perform a call set up procedure for a call; receiving from the first AP a message associated with handover to a second AP; delaying giving up the call setup procedure for a duration if the message includes or is associated with an indication to release a dedicated bearer; and allowing establishment of a DB with the second AP during the duration. Consequently, the DB can be established with the second AP, without the UE giving up the call setup, and the call can (Continued)

be performed, thus improving user experience. Numerous other aspects are provided.

30 Claims, 12 Drawing Sheets

(51) Int. Cl.
| | |
|---|---|
| *H04W 24/10* | (2009.01) |
| *H04W 36/08* | (2009.01) |
| *H04W 72/10* | (2009.01) |
| *H04W 76/10* | (2018.01) |
| *H04W 76/15* | (2018.01) |
| *H04W 36/00* | (2009.01) |
| *H04W 88/08* | (2009.01) |
| *H04W 88/16* | (2009.01) |

(52) U.S. Cl.
CPC ....... *H04W 36/0005* (2013.01); *H04W 36/08* (2013.01); *H04W 72/10* (2013.01); *H04W 76/10* (2018.02); *H04W 76/15* (2018.02); *H04W 88/08* (2013.01); *H04W 88/16* (2013.01)

(58) Field of Classification Search
CPC ... H04W 76/025; H04W 24/10; H04W 72/10; H04W 88/16; H04W 88/08
See application file for complete search history.

(56) References Cited

U.S. PATENT DOCUMENTS

| | | | | |
|---|---|---|---|---|
| 2013/0010752 A1* | 1/2013 | Rydnell | ............ | H04W 36/0011 370/331 |
| 2013/0142168 A1* | 6/2013 | Vedrine | ............ | H04W 36/0022 370/331 |
| 2014/0016582 A1 | 1/2014 | Prakash et al. | | |
| 2014/0051443 A1* | 2/2014 | Diachina | ............ | H04W 36/0022 455/436 |
| 2015/0126197 A1* | 5/2015 | Lee | ............ | H04W 4/14 455/437 |
| 2015/0163709 A1 | 6/2015 | Lee | | |
| 2015/0257178 A1 | 9/2015 | Huang-Fu et al. | | |
| 2016/0021580 A1* | 1/2016 | Mufti | ................ | H04W 36/0022 370/221 |
| 2016/0021587 A1 | 1/2016 | Vargantwar et al. | | |
| 2016/0353340 A1* | 12/2016 | Yang | ................ | H04W 36/0066 |
| 2017/0064585 A1* | 3/2017 | Kim | ................ | H04W 36/00 |
| 2017/0150468 A1* | 5/2017 | Liao | ................ | H04W 60/00 |

OTHER PUBLICATIONS

"Huawei: "LTE Handover execution", 3GPP Draft, R2-063112, 3rd Generation Partnership Project (3GPP), Mobile Competence Centre, 650, Route Des Lucioles, F-06921 Sophia-Antipolis Cedex, France, vol. RAN WG2, no. Riga, Latvia, Nov. 1, 2006, Nov. 2, 2006 (Nov. 2, 2006), XP050132621. [retrieved on Nov. 1, 2006]".
International Search Report and Written Opinion—PCT/US2017/016714—ISA/EPO—dated May 16, 2017.
""Next Generation Network, Interworking between Digital Subscriber Signalling System No. One (DSS1) and Session Initiation Protocol (SIP), Part 1: Protocol Specification, 03012-eNGNv003", ETSI Draft, 03012-ENGNV003, European Telecommunications Standards Institute (ETSI), 650, Route Des Lucioles, F-06921 Sophia-Antipolis, France, vol. zArchive, No. V 0.0.3, Feb. 18, 2005 (Feb. 18, 2005), XP014128738, pp. 1-39. [retrieved on Feb. 18, 2005]".
"Panasonic: "NAS Signalling Transfer", 3GPP Draft, R2-070093, 3rd Generation Partnership Project (3GPP), Mobile Competence Centre, 650, Route Des Lucioles, F-06921 Sophia-Antipolis Cedex, France, vol. RAN WG2, no. Sorrento, Italy, Jan. 12, 2007, Jan. 12, 2007 (Jan. 12, 2007), XP050133208, [retrieved on Jan. 12, 2007]".

* cited by examiner

METHODS AND APPARATUS FOR DEDICATED BEARER ESTABLISHMENT HANDLING DURING CALL SETUP FOR LTE

CROSS-REFERENCE TO RELATED APPLICATION & PRIORITY CLAIM

This application claims benefit of and priority to U.S. Provisional Patent Application Ser. No. 62/296,576, filed Feb. 17, 2016, which is herein incorporated by reference in its entirety for all applicable purposes.

BACKGROUND

Field of the Disclosure

The present disclosure relates generally to wireless communication and, more particularly, to methods and apparatus for dedicated bearer (DB) establishment handling during call setup for long term evolution (LTE).

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

The present disclosure relates generally to wireless communication, and more particularly, to methods and apparatus for dedicated bearer (DB) establishment (e.g., also including bearer release and/or bearer modification) handling during a call setup (e.g., during a call setup procedure) for long term evolution (LTE).

Certain aspects of the present disclosure provide a method for wireless communications that may be performed by a user equipment (UE). The method generally includes establishing a connection with a first access point (AP) to perform a call setup procedure; receiving from the first AP a message associated with handover to a second AP; delaying giving up the call setup procedure for a duration if the message includes an indication to release a dedicated bearer; and allowing establishment of a dedicated bearer with the second AP during the duration.

Certain aspects of the present disclosure provide a method for wireless communications that may be performed by a network entity (e.g., such as a mobile management entity (MME)). The method generally includes sending a request to a first AP to establish a dedicated bearer for a call; receiving a request from the first AP to handover a UE to a second AP; and delaying sending, to the second AP, the request to handover for a duration if the dedicated bearer has not been established with the first BS.

Certain aspects of the present disclosure provide a method for wireless communications that may be performed by a UE. The method generally includes establishing a connection with a first AP to perform a call; and taking action to reduce a likelihood of receiving from the first AP a message associated with handover to a second AP that includes or is associated with an indication to release a dedicated bearer prior to establishment of a dedicated bearer with the first AP.

Certain aspects of the present disclosure provide an apparatus for wireless communications that may be performed by a UE. The apparatus generally includes means for establishing a connection with a first AP to perform a call setup procedure; means for receiving from the first AP a message associated with handover to a second AP; means for delaying giving up the call setup procedure for a duration if the message includes an indication to release a dedicated bearer; and means for allowing establishment of a dedicated bearer with the second AP during the duration.

Certain aspects of the present disclosure provide an apparatus for wireless communications that may be performed by a network entity (e.g., such as an MME). The apparatus generally includes means for sending a request to a first AP to establish a dedicated bearer for a call; means for receiving a request from the first AP to handover a UE to a second AP; and means for delaying sending, to the second AP, the request to handover for a duration if the dedicated bearer has not been established with the first BS.

Certain aspects of the present disclosure provide an apparatus for wireless communications that may be performed by a UE. The apparatus generally includes means for establishing a connection with a first AP to perform a call; and means for taking action to reduce a likelihood of receiving from the first AP a message associated with handover to a second AP that includes or is associated with an indication to release a dedicated bearer prior to establishment of a dedicated bearer with the first AP.

Certain aspects of the present disclosure provide an apparatus for wireless communications that may be performed by a UE. The apparatus generally includes at least one processor configured to establish a connection with a first AP to perform a call setup procedure for a call; obtain from the first AP a message associated with handover to a second AP; delay giving up the call setup procedure for a duration if the message includes an indication to release a dedicated bearer; and allow establishment of a dedicated bearer with the second AP during the duration; and a memory coupled with the at least one processor.

Certain aspects of the present disclosure provide an apparatus for wireless communications that may be performed by a network entity (e.g., such as an MME). The apparatus generally includes at least one processor configured to output for transmission a request to a first AP to establish a dedicated bearer for a call; obtain a request from the first AP to handover a UE to a second AP; and delay sending, to the second AP, the request to handover for a duration if the dedicated bearer has not been established with the first BS; and a memory coupled with the at least one processor.

Certain aspects of the present disclosure provide an apparatus for wireless communications that may be performed by a UE. The apparatus generally includes at least one processor configured to establish a connection with a first AP to perform a call; and take action to reduce a likelihood of receiving from the first AP a message associated with handover to a second AP that includes or is associated with an indication to release a dedicated bearer prior to establishment of a dedicated bearer with the first AP; and a memory coupled with the at least one processor.

Certain aspects of the present disclosure provide a computer readable medium having computer executable code stored thereon for wireless communications that may be performed by a UE. The code generally includes code for establishing a connection with a first AP to perform a call setup procedure for a call; code for receiving from the first AP a message associated with handover to a second AP; code for delaying giving up the call setup procedure for a duration if the request includes an indication to release a dedicated bearer; and code for allowing establishment of a dedicated bearer with the second AP during the duration.

Certain aspects of the present disclosure provide a computer readable medium having computer executable code stored thereon for wireless communications that may be performed by a network entity (e.g., such as an MME). The code generally includes code for sending a request to a first AP to establish a dedicated bearer for a call; code for receiving a request from the first AP to handover a UE to a second AP; and code for delaying sending, to the second AP, the request to handover for a duration if the dedicated bearer has not been established with the first BS.

Certain aspects of the present disclosure provide a computer readable medium having computer executable code stored thereon for wireless communications that may be performed by a UE. The code generally includes code for establishing a connection with a first AP to perform a call; and code for taking action to reduce a likelihood of receiving from the first AP a message associated with handover to a second AP that includes or is associated with an indication to release a dedicated bearer prior to establishment of a dedicated bearer with the first AP.

Other aspects, features, and aspects of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the invention disclosure herein. In similar fashion, while exemplary aspects may be discussed below as device, system, or method aspects it should be understood that such exemplary aspects can be implemented in various devices, systems, methods, and computer readable media.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
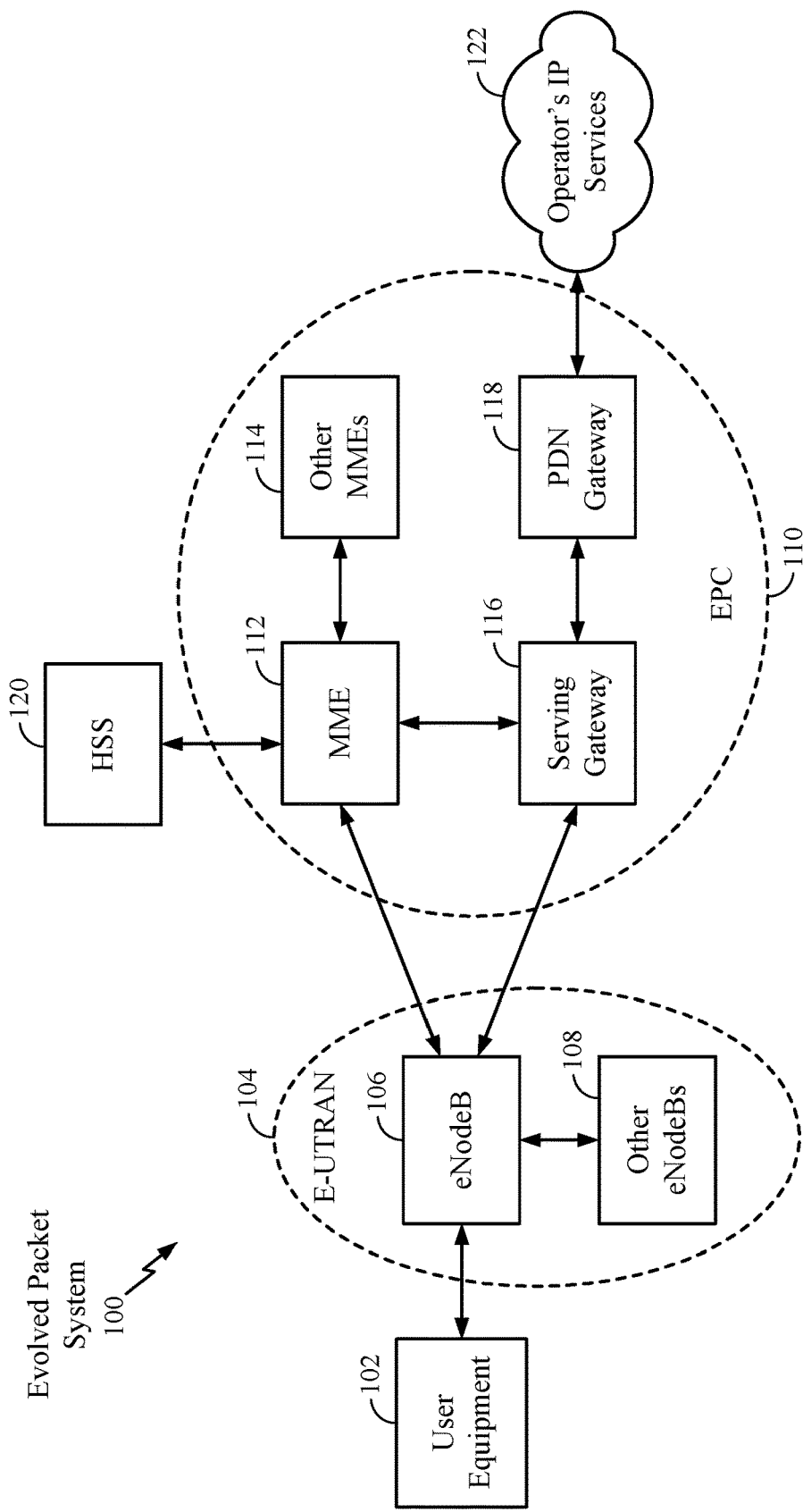
FIG. 1 is a diagram illustrating an example of a network architecture, in accordance with certain aspects of the disclosure.

Aspects of the present disclosure discuss techniques for dedicated bearer (DB) (e.g., a dedicated evolved packet system (EPS) radio bearer, such as a DB for voice over Internet protocol (VoIP) voice traffic) establishment (e.g., also including bearer release and bearer modification) handling during a call setup for long term evolution (LTE). The techniques include delaying sending of a message to give up the call setup (e.g., delaying sending an IP multimedia subsystem (IMS) cancel message or IMS failure message to the network) when a message is received indicating release or modification of a DB. The delay can be based on a timer that is started when the bearer release or modification indication is received. In addition, the UE can prevent receiving bearer release or modification during call setup by delaying sending one or more measurement reports and/or by adjusting a priority of one or more channels used to establish a signaling bearer, a default bearer, and/or a DB and used to exchange handover information—this may reduce a likelihood of receiving a handover message during a call setup prior to establishing the DB. On the network-side, one or more entities of the network can delay sending or forwarding the handover request (e.g., associated with the message) to a target base station if the one or more entities of the network have not received an indication that the dedicated bearer setup is complete. The one or more entities of the network can also adjust priority of channels to reduce the likelihood of receiving the handover request before the indication of the dedicated bearer setup completion.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspect. Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some implementations, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later.

An Example Wireless Communication System

FIG. 1 is a diagram illustrating a network architecture 100 in which aspects of the present disclosure may be practiced.

For example, the UE 102 can establish a connection with eNB 106 to perform a call. During call setup, the UE 102 can receive a message or request from the eNB 106 to handover to an eNB 108. The UE 102 can delay giving up the call setup for a duration if the message or request includes an indication to release or modify a dedicated bearer. The UE 102 can then allow establishment of a dedicated bearer with the eNB 108 during the delay.

Figure 1A:
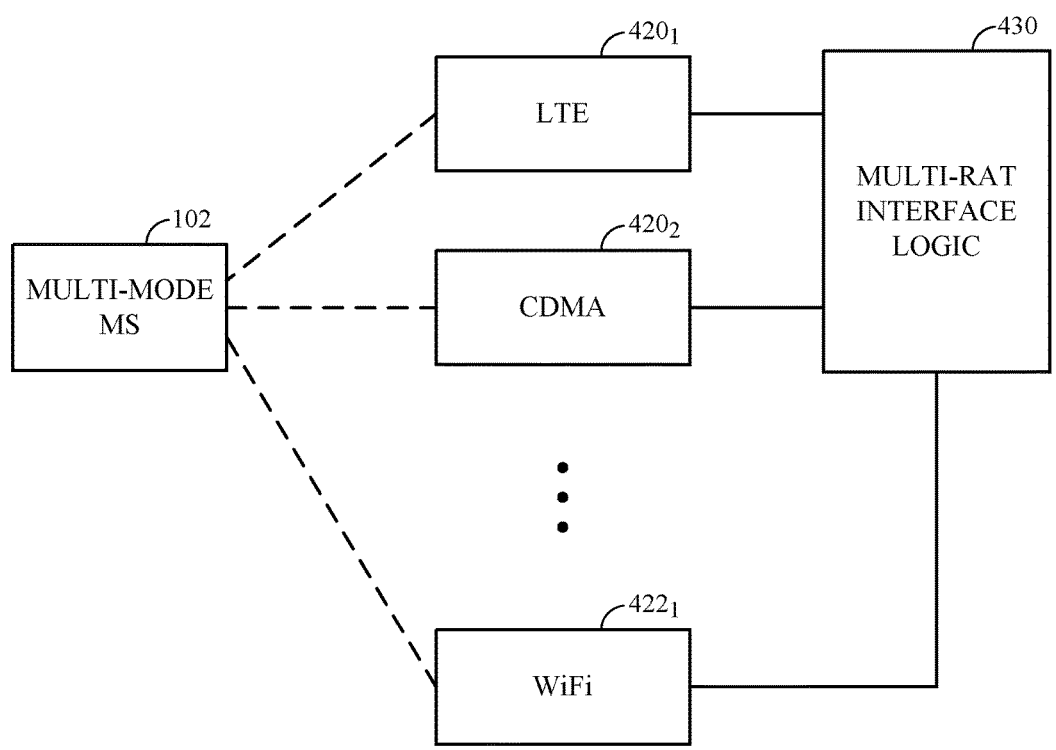
FIG. 1A illustrates an example multi-mode mobile station, in accordance with certain aspects of the present disclosure.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, as shown in FIG. 1A. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. In aspects, an exemplary access network may include an access network for VoIP Voice Traffic.

Some mobile stations (MS) support communications with multiple radio access technologies (RATs). For example, as illustrated in FIG. 1B, a multi-mode MS 102 may support LTE for broadband data services and voice services. Illustratively, LTE is shown as a first RAT $420_1$, CDMA is shown as a second RAT $420_2$, and Wi-Fi is shown as a third RAT $422_1$.

In certain applications, multi-RAT interface logic 430 may be used to exchange information between both wide-area (e.g., long-range) and local-area (e.g., short-range) RATs. This may enable a network provider to control how, e.g., through which RAT, an end user of the multi-mode MS 102 actually connects to the network. The interface logic 430 may support local IP connectivity or IP connectivity to a core network, for example. For example, a network provider may be able to direct the multi-mode MS to connect to the network via a WLAN (e.g., a WiFi WLAN or other local-area RAT), when available. This capability may allow a network provider to route traffic in a manner that eases congestion of particular air resources. In effect, the network provider may use local-area RATs to distribute some air traffic of a wide-area RAT into a wireline network or to distribute some air traffic from a congested wireless network to a less congested wireless network. The traffic may be re-routed from the local-area RAT when conditions mandate, such as when a mobile user increases speed to a certain level not suitable for a local-area RAT.

Returning to FIG. 1, as shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
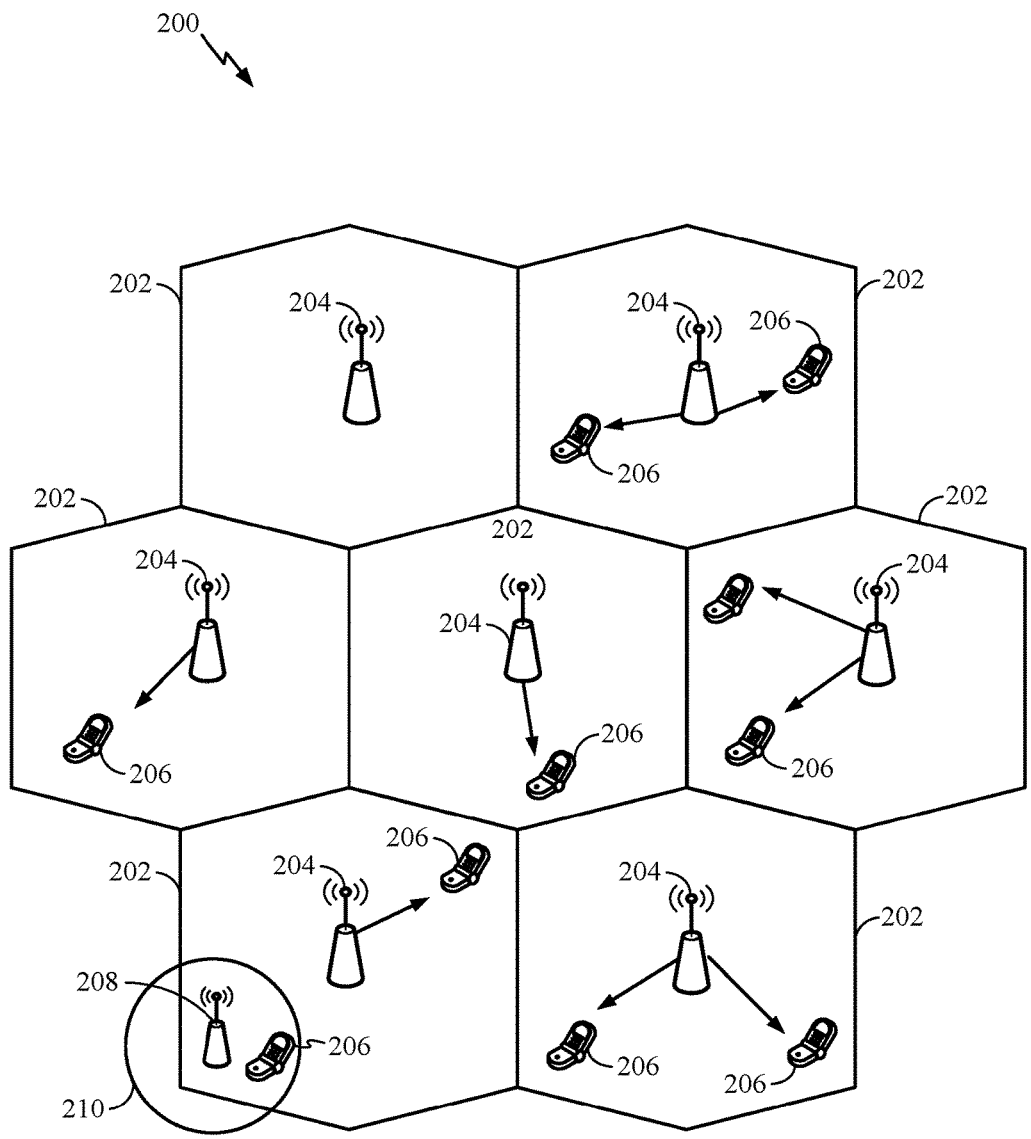
FIG. 2 is a diagram illustrating an example of an access network, in accordance with certain aspects of the disclosure.

FIG. 2 is a diagram illustrating an example of an access network 200 in an LTE network architecture in which aspects of the present disclosure may be practiced. For example, UEs 206 may be configured to implement techniques for DB establishment handling during call setup (e.g., for LTE) described in aspects of the present disclosure.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
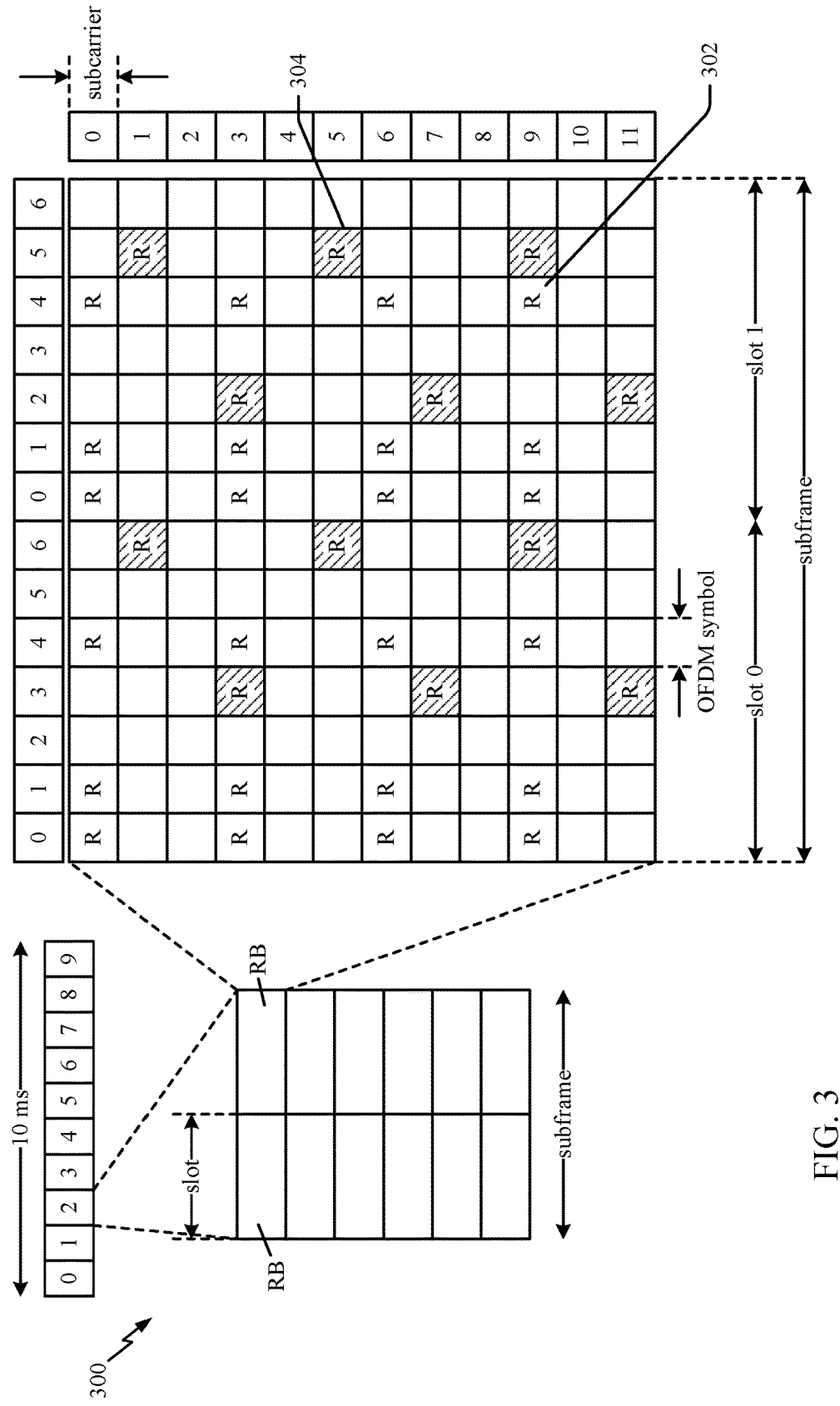
FIG. 3 is a diagram illustrating an example of a downlink frame structure in long term evolution (LTE), in accordance with certain aspects of the disclosure.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
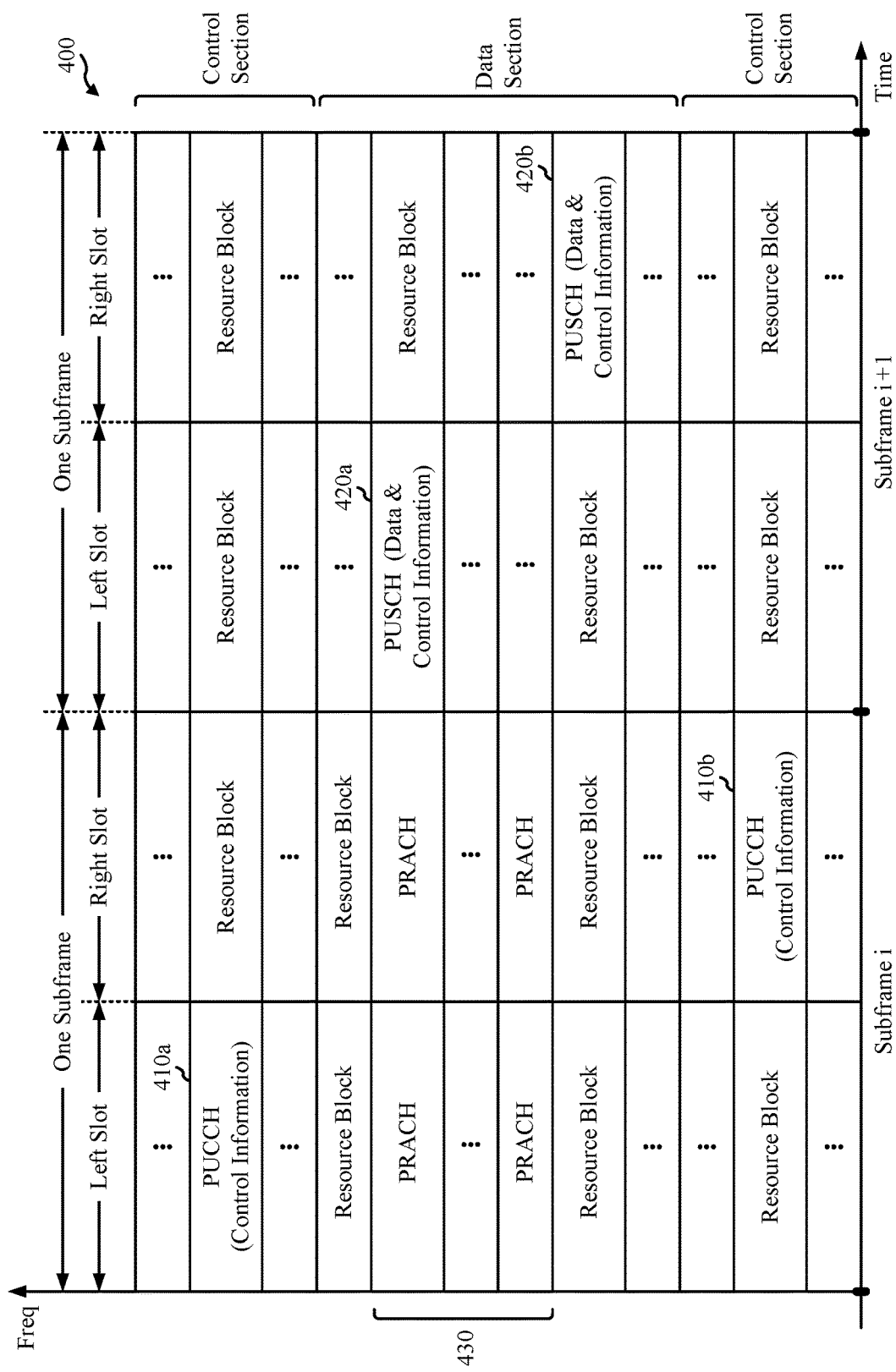
FIG. 4 is a diagram illustrating an example of an uplink frame structure in LTE, in accordance with certain aspects of the disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
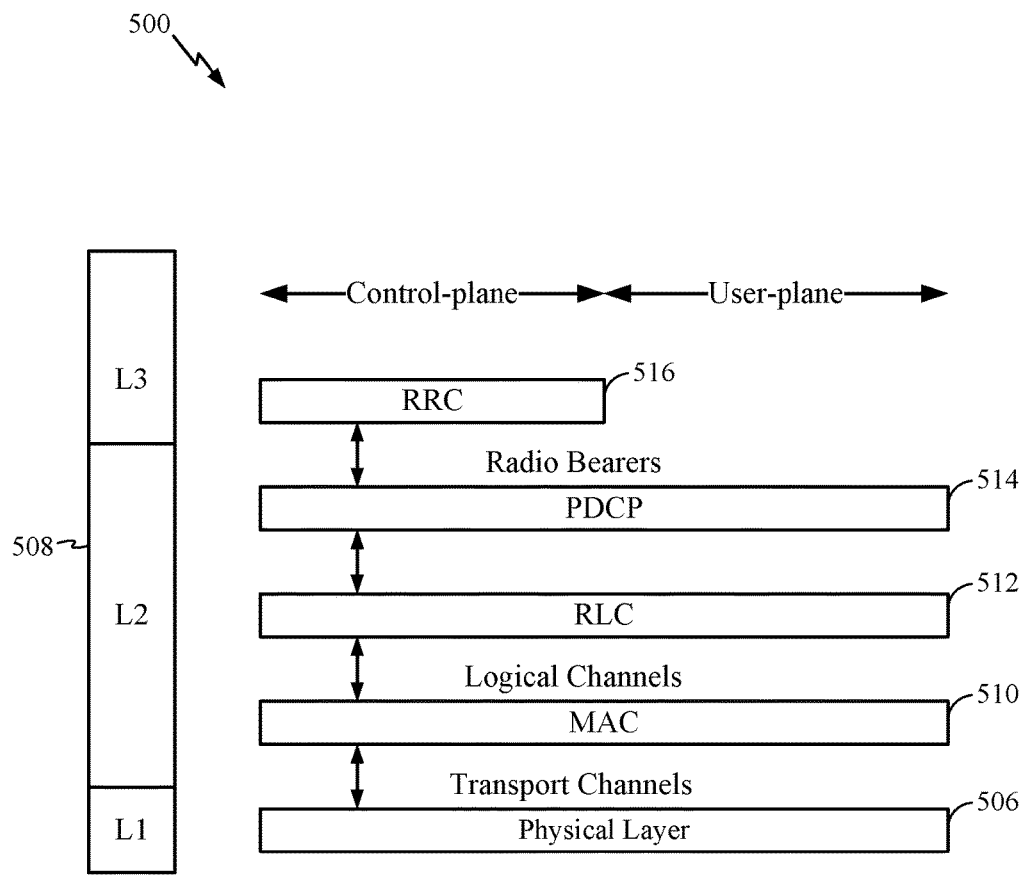
FIG. 5 is a diagram illustrating an example of a radio protocol architecture for the user and control plane, in accordance with certain aspects of the disclosure.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
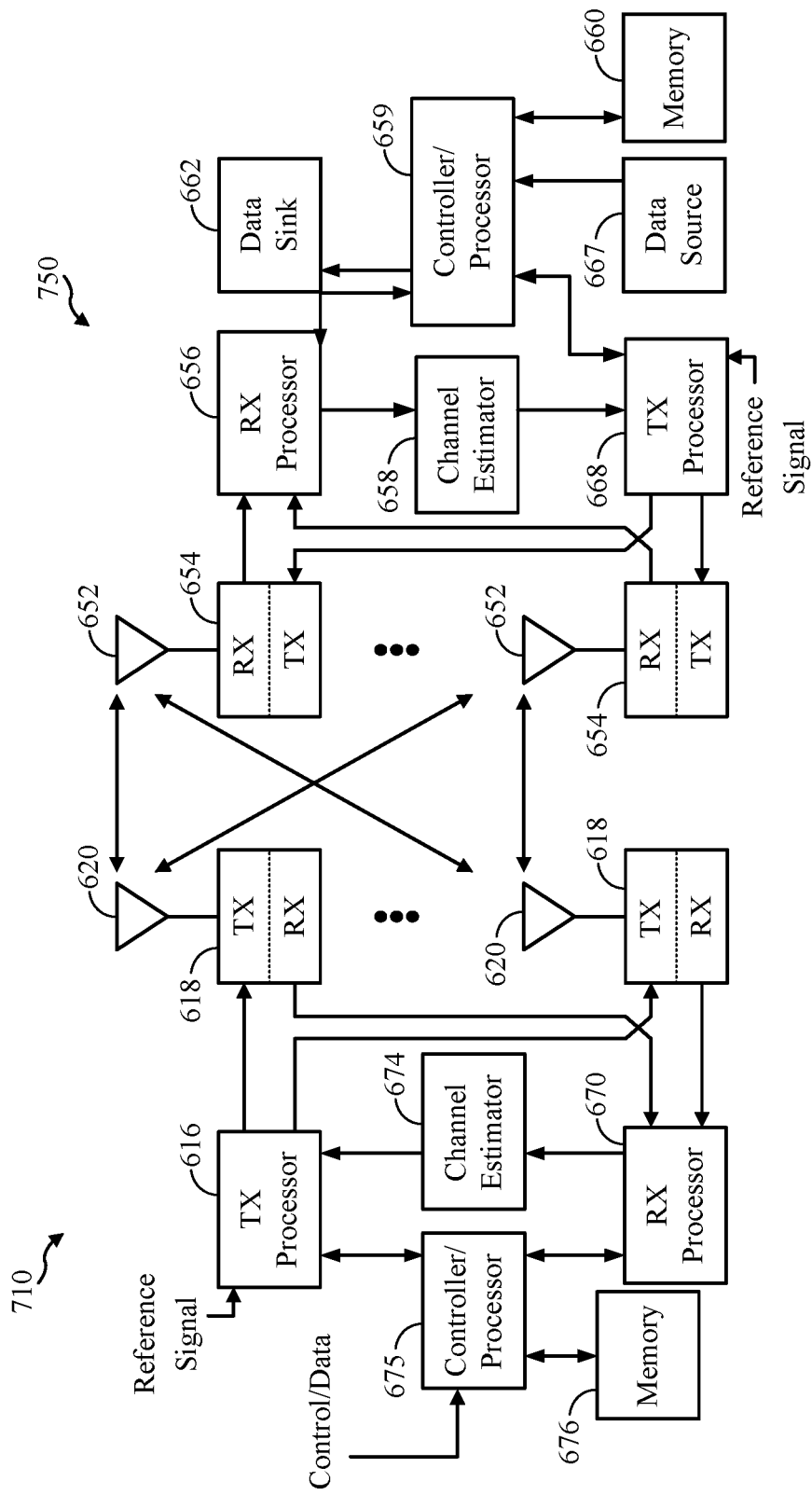
FIG. 6 is a diagram illustrating an example of an evolved Node B (eNB) and user equipment (UE) in an access network, in accordance with certain aspects of the disclosure.

FIG. 6 is a block diagram of an eNB 610 in communication with a UE 650 in an access network, in which aspects of the present disclosure may be practiced.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

Figure 9:
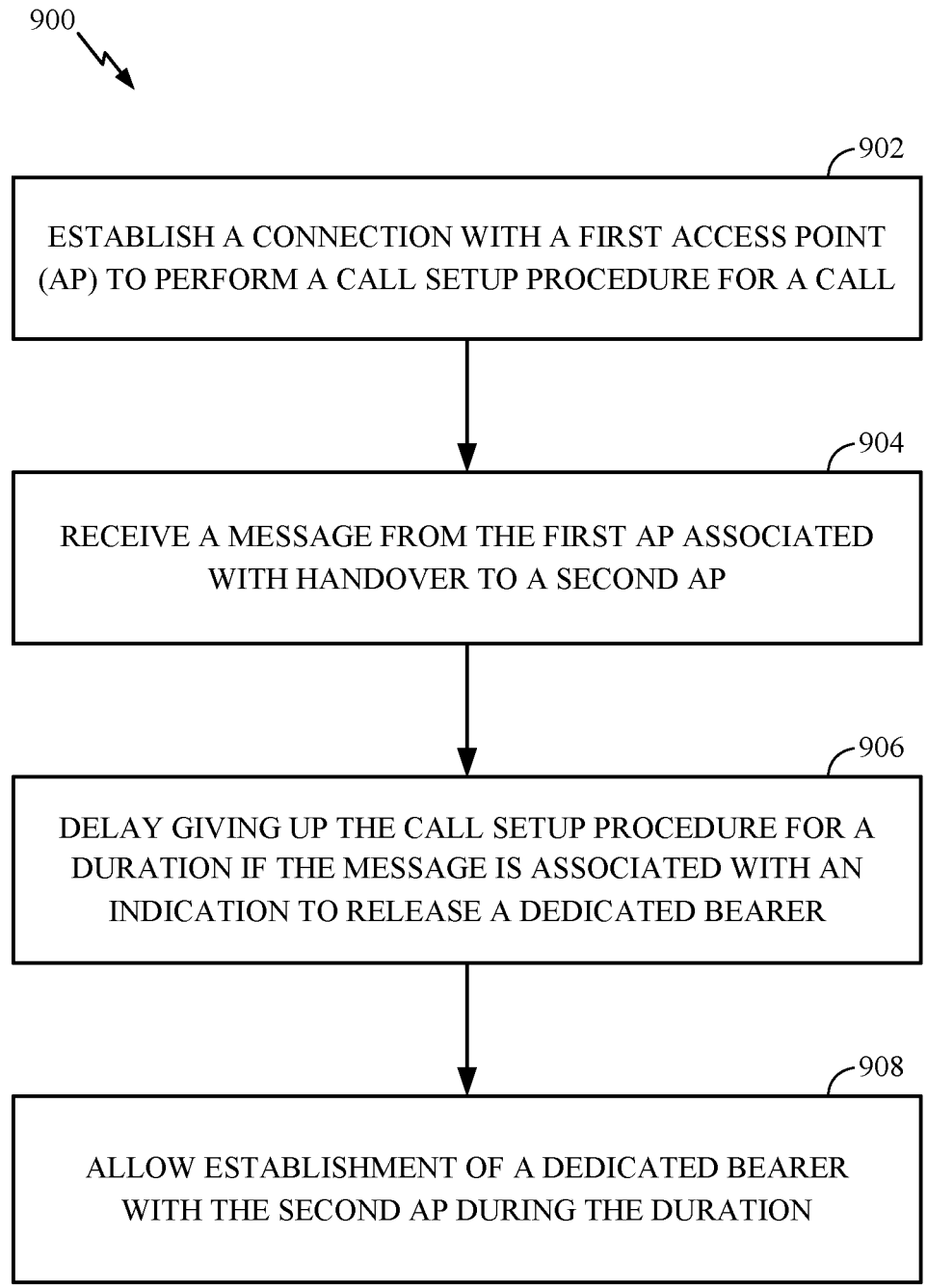
FIG. 9 is an example flow diagram illustrating example operations for DB establishment handling during a call setup procedure for LTE that may be performed by a UE, in accordance with aspects of the present disclosure.
Figure 11:
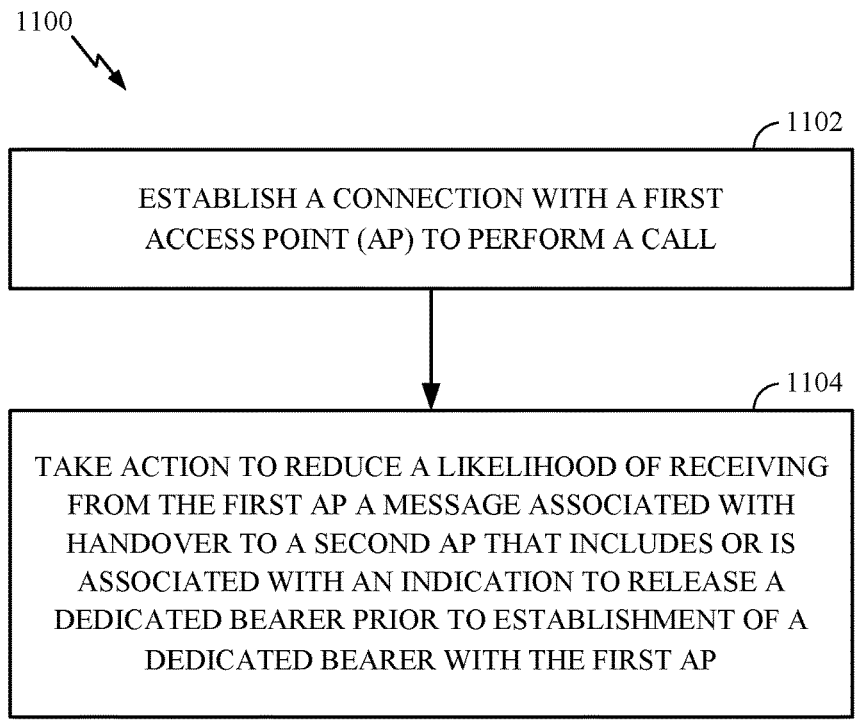
FIG. 11 is an example call flow diagram illustrating example operations for DB establishment handling during a call setup procedure for LTE that may be performed by a UE, in accordance with certain aspects of the present disclosure.
Figure 12:
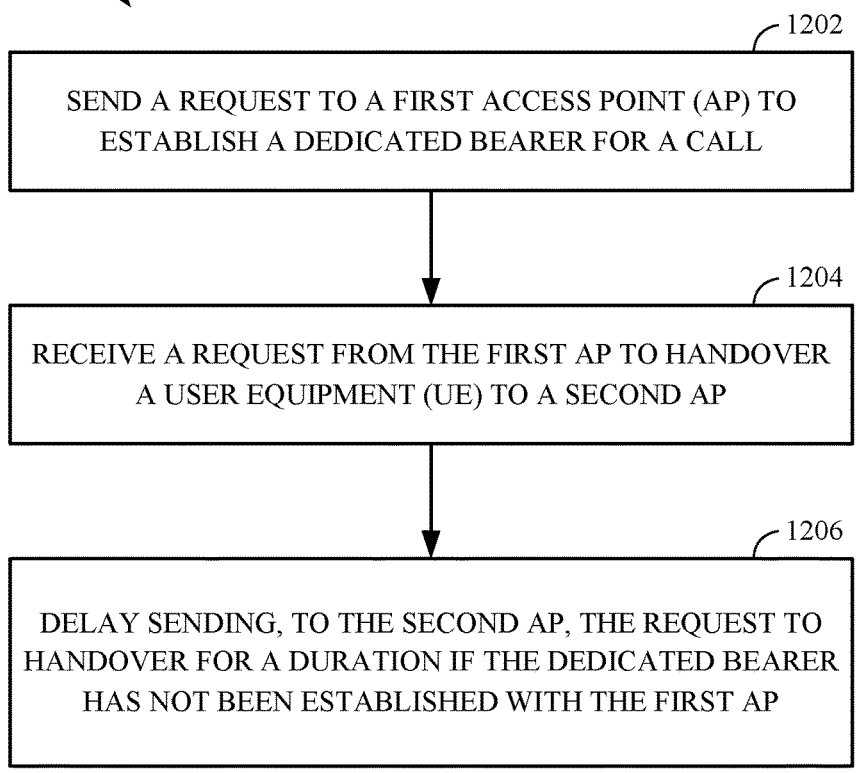
FIG. 12 is an example flow diagram illustrating example operations for DB establishment handling during a call setup procedure for LTE that may be performed by a network entity, in accordance with aspects of the present disclosure.

The controller/processor 659 and/or other processors, components and/or modules at the UE 650 may perform or direct operations, for example, operations 900 in FIG. 9, operations 1100 in FIG. 11, operations 1200 in FIG. 12, and/or other processes for the techniques described herein for improving inter-RAT measurements. In certain aspects, one or more of the components shown in FIG. 6 may be employed to perform example operations 900, operations 1100, operations 1200, and/or other processes for the techniques described herein. In certain aspects, one or more of any of the network entities, such as the MME 112, shown in FIG. 1 may be employed to perform example operations, such as operations 1200, and/or other processes for the techniques described herein. The memories 660 and 676 may store data and program codes for the UE 650 and eNB 610 respectively, accessible and executable by one or more other components of the UE 650 and the eNB 610.

Example Techniques for Dedicated Bearer Establishment Handling During Call Setup Certain networks, for example, such as long term evolution (LTE) networks, may be packet-switched Internet Protocol (IP)-based networks. Circuit-switched (CS) connections may not be supported in such networks. It may be desirable for voice calls and data to be carried on the same LTE network. Voice over LTE (VoLTE) is a service for carrying voice and data on LTE. VoLTE may have advantages over voice and video telephony (VT) for multimedia communications over LTE.

Figure 7:
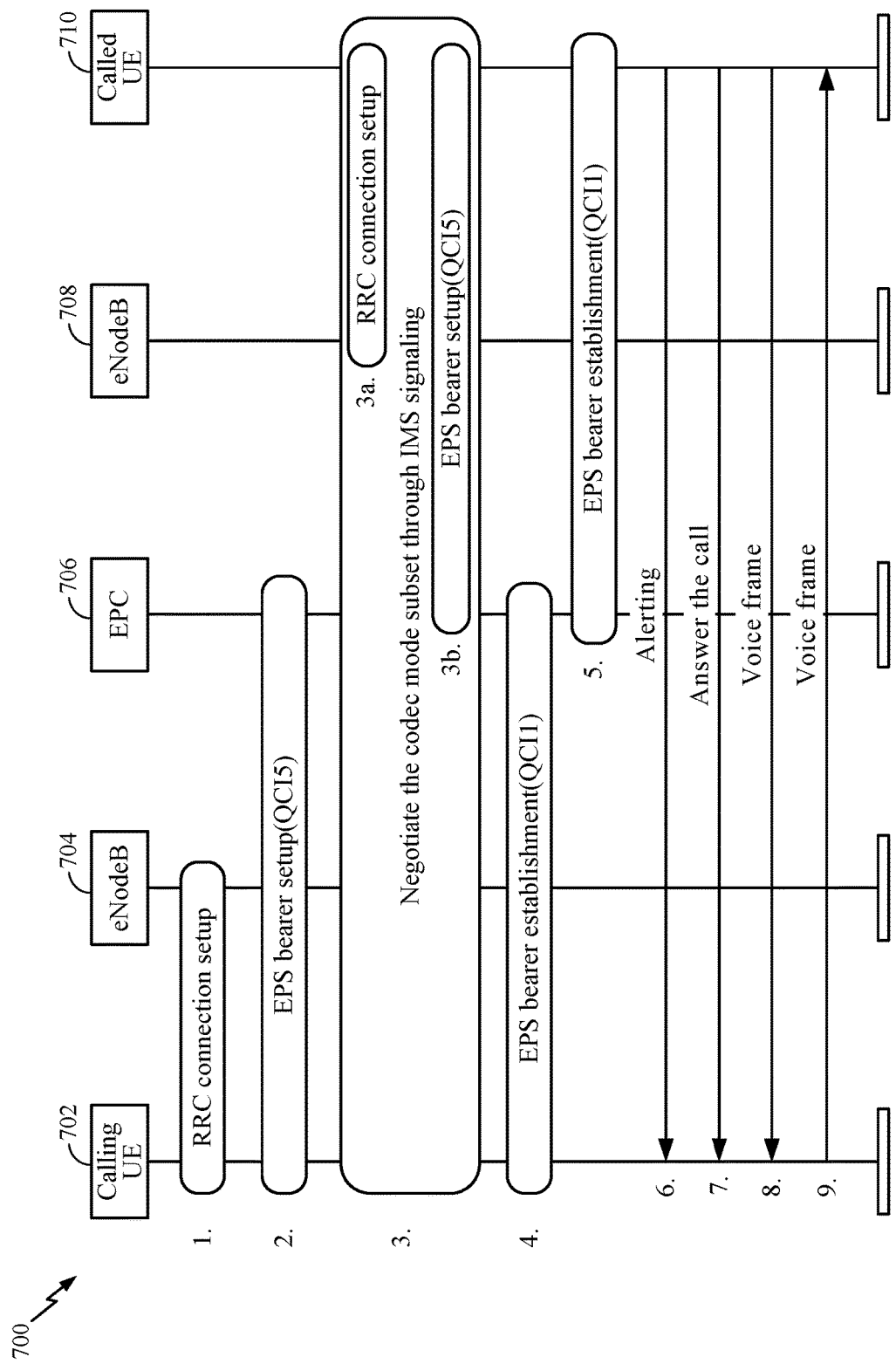
FIG. 7 is an example call flow diagram illustrating a successful call setup procedure for a voice over LTE (VoLTE) call, in accordance with certain aspects of the present disclosure.

FIG. 7 is an example call flow diagram illustrating a successful call setup procedure 700 for a VoLTE call, in accordance with certain aspects of the present disclosure. As shown in the FIG. 7, in order to perform the VoLTE call setup, at 1, the UE 702 performs a radio resource control (RRC) connection setup with the serving eNB 704. In one example, although not shown in FIG. 7, the call setup can be in response to a mobile originated (MO) call being initiated (e.g., by the user pressing a key on the device) or after paging is received for a mobile terminated (MT) call.

As part of the connection setup, at 2, a signaling radio bearer (SRB1) is setup, via the Evolved Packet Core (EPC) 706, to exchange RRC messages between the UE 702 and the eNB 704. Although not shown in FIG. 7, another SRB (SRB2) is set up to exchange non-access stratus (NAS) messages between the UE 702 and the serving eNB 704. At 3, the codec mode subset is negotiated through Internet Protocol (IP) multimedia subsystem (IMS) signaling. During the negotiation, at 3*a*, the called UE 710 and its serving eNB 708 may establish a connection via RRC signaling. At 3*b*, the another SRB is setup via the EPC 706 with the called UE 710. At 4, the UE 702 sets up a first default bearer (e.g., a first default EPS bearer) with data service APN (e.g., having a first IP address) and a second default bearer (e.g., a second default EPS bearer) with an IMS APN (e.g., having a different IP address than the first default bearer). At 5, the default bearers are setup with the called UE 710.

Although not shown in FIG. 7, once these bearers are setup, the UE 702 sends IMS signaling (e.g., an IMS Invite message) to the IMS core using the second default bearer. The IMS core informs the network, for example, the mobile management entity (MME) to setup a dedicated bearer (DB) to carry VoLTE voice traffic. At this point, the UE 702 and one or more network nodes (e.g., the serving eNB 704 and the MME) are in-sync regarding the UE context and the number of established bearers. If a handover is needed, bearers (e.g., all bearers), including the DRB, will be transferred from the source (e.g., serving) eNB to the target eNB as part of the handover procedure, allowing the call setup continue.

As shown in FIG. 7, once the call setup is completed, at 6, the 702 receives alerting from the call UE 710 and, at 7, the UE 702 answers the call and exchanges voice frames with the far-end UE (e.g., in FIG. 7 shown the called UE 710 for MO call, for MT call the far-end UE is the calling UE) at 8 and 9.

The different bearers can be associated with different Quality-of-Service (QoS) identifiers (QCIs), a bearer ID, and/or channel priorities. For example, a dedicated bearer (e.g., for VoIP voice traffic) may be associated with QCI 1, channel priority level 2, and bearer ID 5; a default bearer with IMS APM for IMS signaling may be associated with QCI 5, channel priority level 1, and bearer ID 4; a default bearer with data APN for PS data may be associated with QCI 9, channel priority level 8, and bearer ID 3; a SRB for NAS signaling may be associated with a channel priority level 3 and a bearer ID 1; and a SRB for RRC signaling may be associated with a channel priority level 1 and bearer ID 1. The channel priority level may define which channel or bearer should send data first when receiving transmission opportunity; a lower channel priority level means higher priority (e.g., channel priority level 1 being the highest priority, channel priority level 2 being a lower priority, etc.).

While FIG. 7 illustrates a successful DB establishment and VoLTE call, in some cases, the DB establishment may be interrupted during call setup, causing the UE to give up the call set up, for example, in cases where the UE receives an indication to release or modify bearers during the call setup, such as in the case of receiving a handover command during the call setup.

Figure 8:
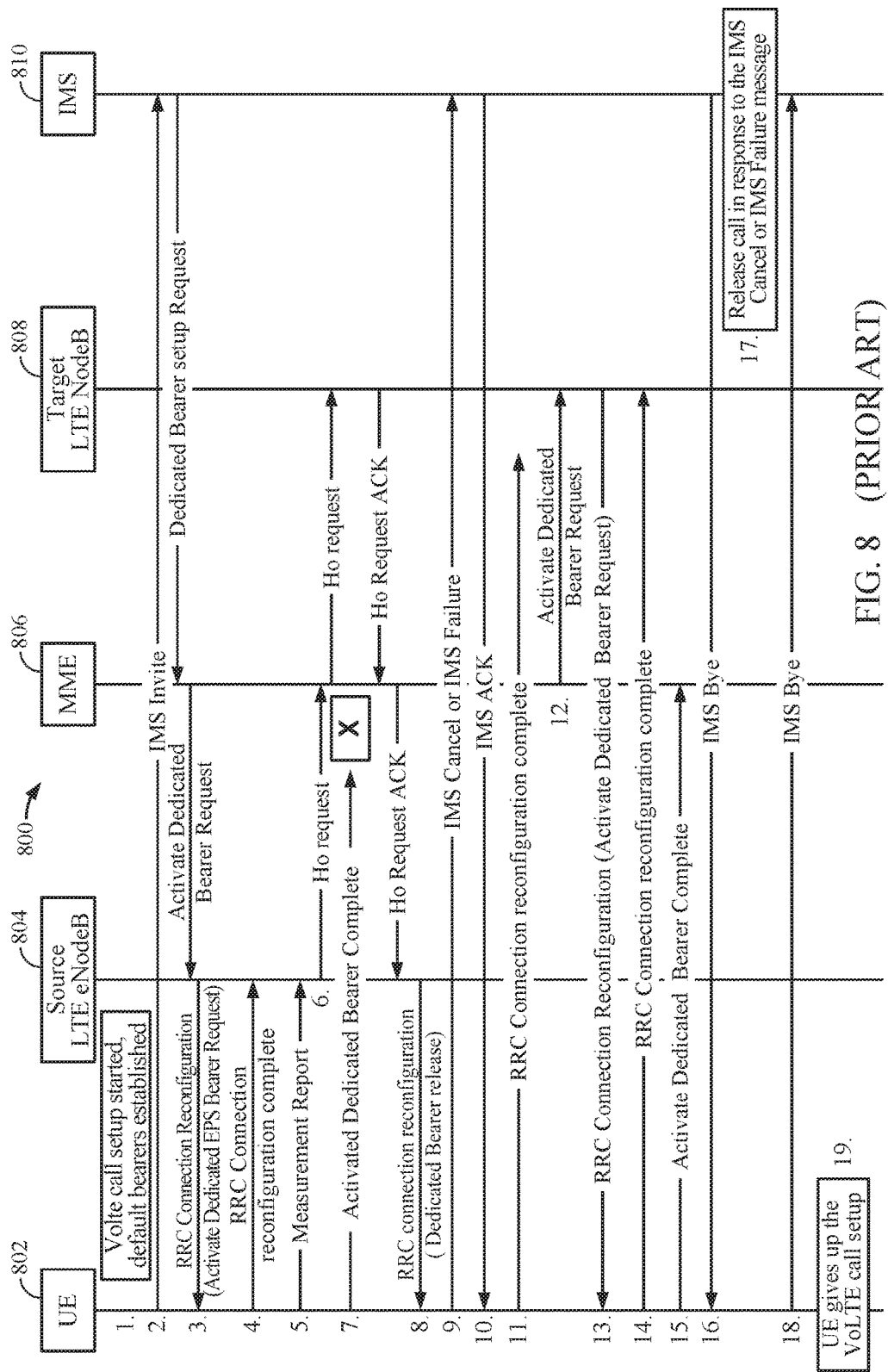
FIG. 8 is an example call flow diagram illustrating dedicated bearer (DB) release handling during a call setup procedure for a VoLTE call.

FIG. 8 is an example call flow diagram illustrating DB release handling during a setup procedure 800 for a VoLTE call. As shown in FIG. 8, at 1, the UE 802 may be in the process of establishing a VoLTE call with the source LTE eNodeB 804 (e.g., the serving eNB)—the RRC connections, SRBs, and default bearers are already setup. At this stage, the UE 802 and network may begin the processing of attempting to establish the DB for the call. At 2, the DB establishment process may be initiated by the UE 802 sending an IMS invite message to the IMS core 810. At 3, the network may respond to the IMS invite message, for example, the IMS core 810 may send a Dedicated Bearer Setup request to the MME 806. The MME 806 may send an Active Dedicated Bearer (e.g., QCI=1 bearer) Request message to the source LTE eNB 804, which may forward the request or a message associated therewith to the UE 802, for example, in the RRC Connection Reconfiguration message. As shown in FIG. 8, at 7, the UE 802 may respond to the message or request message with an Activated Dedicated Bearer Complete message for the MME 806 to setup the DB.

As shown in FIG. 8, before the MME 806 receives the Activated Dedicated Bearer Complete (or Accept) message from the UE 802, after sending an RRC Connection Reconfiguration Complete message to the source LTE eNB 804, at 4, the UE 802 may send or have sent a measurement report to the source LTE eNB 804 at 5. Based on the measurement report, the source LTE eNB 804 may decide that the UE 802 should handover to the target LTE eNB 808 and/or trigger the handover procedure. For example, at 6, the source LTE eNB 804 may send an HO request to the MME 806, which the MME 806 forwards to the target LTE eNB 808.

In this case, the MME 806 receives the handover request message from source LTE eNB 804 before receiving an indication that the dedicated bearer has been established, for example, before receiving the Activated Dedicated Bearer Complete message sent from the UE 802 at 7. This can lead to a context mismatch between the UE 802, the source LTE eNB 804, the target LTE eNB 808, and/or the MME 806. For example, the source LTE eNB 804 may know that the DB has been established with the UE 802, but the MME 806 does not know because it has not yet received the indication. In this case, when the MME 806 forwards the handover request to the target LTE eNB 808, at 6, the MME 806 indicates the SRBs and the default bearers that have been established, but will not indicate the DB as part of the UE context to handover to the target LTE eNB 808.

As shown in FIG. 8, at 8, the target LTE eNB 808 sends a HO Request ACK message the MME 806, which forwards the message to the source LTE eNB 804, which in turn forwards the RRC Connection Reconfiguration message to the UE 802. Since the MME 806 did not indicate the DB in the handover message to the target LTE eNB 808 (because the MME 806 was not aware that the DB has been established), the RRC Connection Reconfiguration message includes a Dedicated Bearer Release indication for handover to the target LTE eNB 808. Upon receiving the release indication, the UE 802 gives up the call. For example, for a mobile originated (MO) VoLTE call, at 9, the UE 802 immediately (e.g., without delay, such as a predetermined and/or configurable delay) sends an IMS cancel message (e.g., a SIP cancel message) and for mobile terminated (MT) VoLTE call, the UE sends a pre-condition IMS failure message to IMS core 810. At 10, the IMS core 810 may respond with an IMS ACK message to the UE 802.

Once the handover to the target LTE eNB 808 is completed, the UE 802 my send an RRC Connection Reconfiguration Complete message, at 11. Because from the MME perspective the DB was not established with the source LTE eNB 804 and, therefore, not provided to the target LTE eNB 808 during the handover procedure, at 12, the MME 806 sends a second Activate Dedicated EPS bearer message to the target LTE eNB 808. In response, at 13, the target LTE eNB 808 sends the request or a message associated therewith to the UE 802, for example, in the RRC Connection Reconfiguration message. The UE 802 responds with the RRC Connection Reconfiguration message to target LTE eNB 808, at 14, and the Activate Dedicated EPS bearer Complete, at 15, to the MME 806.

At this point, the DB is successfully setup on the target LTE eNB 808. However, since the UE 802 already gave up the call setup, the IMS will cancel the call from the network side, for example, by sending the IMS Bye message, at 16, and releasing the call setup at 17. At 18, the UE 802 responds with an IMS Bye message and gives up the call set up at 19. Therefore, although the handover was completed and all of the SRBs, default bearers, and the DB are established on the target eNB, the VoLTE call setup still fails. This may degrade user experience, for example, the user may be required to redial the call.

This problem may additionally or alternatively occur when a handover procedure takes place during a DB modification.

Accordingly, techniques are desirable for DB release/modification handling during call setup for LTE to avoid or mitigate call setup failure.

Aspects of the present disclosure discuss techniques for dedicated bearer (DB) release and modification handling during call setup for long term evolution (LTE) by delaying sending a message to drop the call or setup thereof (e.g., by sending an IP multimedia subsystem (IMS) cancel or IMS failure message to the network) when a message received indicating release or modification of a dedicated bearer for a duration (e.g., based on a timer started when the indication is received). In addition, the UE can delay sending one or more measurement reports, adjust a priority of one or more channels used to establish respective bearers, and/or exchange handover information in order to reduce a likelihood of receiving a handover request or message associated with such request prior to establishing a DB. Further, the eNB can delay forwarding a handover request or adjust a priority of one or more channels used to establish respective bearers and/or exchange handover information in order to reduce the likelihood of receiving a handover request prior to establishing a DB.

FIG. 9 is an example flow diagram illustrating example operations 900 for DB establishment handling during a call setup procedure for LTE, in accordance with aspects of the present disclosure. The operations 900 may be performed, for example, by a UE (e.g., UE 102). The operations 900 may begin, at 902, by establishing a connection with a first access point (AP) to perform a call setup procedure for a call. At 904, the UE receives from the first AP a message associated with a handover (e.g., effectively a request from the first AP to perform a handover) to a second AP. At 906, the UE delays giving up the call setup procedure for a duration if the message is associated with an indication to release a dedicated bearer. At 908, the UE allows establishment of the dedicated bearer with the second AP during the duration.

Example UE Delay Giving Up VoLTE

Figure 10:
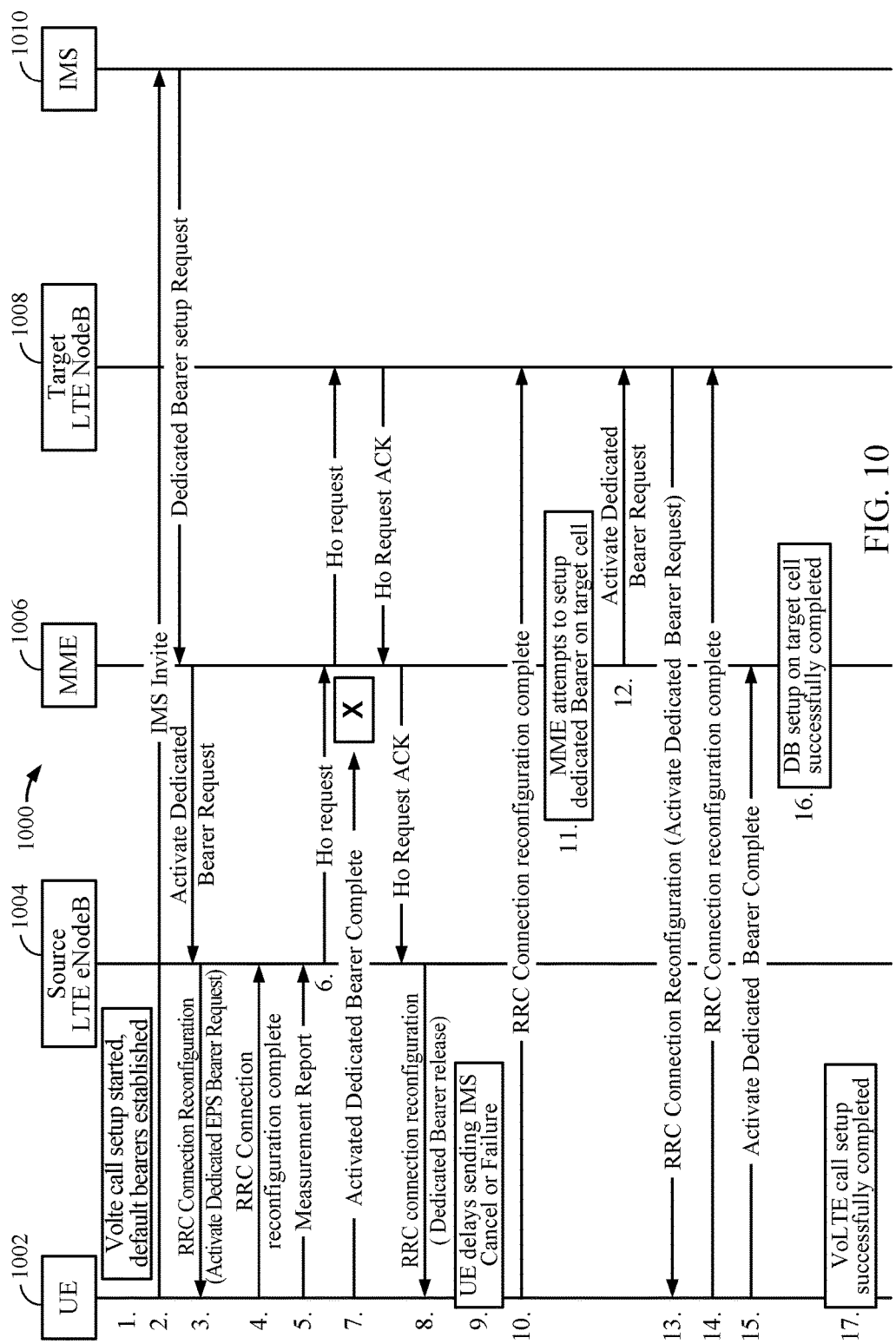
FIG. 10 is an example call flow diagram illustrating DB establishment handling during a call setup procedure for a VoLTE call, in accordance with certain aspects of the present disclosure.

FIG. 10 is an example call flow diagram illustrating dedicated bearer (DB) release handling in call setup procedure 1000 for a VoLTE call, in accordance with certain aspects of the present disclosure. According to certain aspects, if the UE receives the handover message or command indicating, or associated with, a DB release or modification, the UE can delay giving up the call setup for a duration. As shown in FIG. 10, the steps 1-8, may be similar to as shown in FIG. 8 where, as described with respect to FIG. 8, the MME 1006 receives a handover request message from source LTE eNB 1004 before receiving an indication that the dedicated bearer has been established, for example, before receiving the Activated Dedicated Bearer Complete message sent from the UE 1002 at 7. This can lead to a mismatch such as a state, context state and/or context mismatch between the UE 1002, the source LTE eNB 1004, the target LTE eNB 1008, and/or the MME 1006. In this case, the RRC Connection Reconfiguration message, at 8, includes a Dedicated Bearer Release indication for handover to the target LTE eNB 1008. In aspects, the dedicated bearer release modification is carried in non-handover command, which may be associated with the handover command.

According to certain aspects, upon receiving the release indication, the UE 1002 may delay giving up the call, at 9. For example, the delay may be a predetermined and/or configurable delay. The UE 1002 may delay giving up the call by delaying sending the IMS cancel message and/or IMS precondition failure message. In an example implementation, the UE 1002 can start an internal timer (e.g., a $T_{WaitForQoSGrant}$ timer) when the UE 1002 receives the handover message indicating or associated with the DB release or modification, or receives an indication of/or associated with a handover failure event. In one example, this timer may be around 2 seconds; however, other durations can be used. According to certain aspects, the length of duration (e.g., the timer length) can be adjustable. For example, the length may be set based on a handover type including whether the handover is an intra-LTE handover, an intra-frequency handover, an inter-frequency handover, an inter-RAT handover, a reference receive signal power (RSRP)/reference signal receive quality (RSRQ), and/or a difference of the serving cell's RSRP/RSRQ and the target cell (e.g., a neighboring cell) RSRP/RSRQ.

As shown in FIG. 10, during the delay, at 11, the MME 1006 attempts to setup the dedicated bearer on the target LTE eNB 1008 after the handover is completed (at 10). If the DB is setup on the target LTE eNB 1008 (e.g., and a desired quality of service (QoS) is acquired on the DB) during the delay (e.g., before expiry of the timer), the UE can continue the call setup (e.g., VoLTE call establishment). For example, as shown in FIG. 10, the DB is successfully setup on the target LTE eNB 1008 (steps 12-16) during the delay and, at 17, the VoLTE call setup is successfully completed at the UE 1002. Thus, by delaying giving up the call setup, if the DB can be setup on the target cell, then the UE can proceed normally with the call setup and the user experience will not be degraded (e.g., the user does not have to redial the call).

Alternatively, if the DB is not successfully setup (e.g., or the desired QoS is not achieved) during the duration, then the UE gives up the call setup (e.g., sends the IMS cancel and/or IMS precondition failure message).

According to certain aspects, the techniques discussed above may also apply to an inter-RAT handover of the UE, for example, from WiFi to LTE. If the UE transitions from WiFi to LTE, the UE may initiate the timer when the handover to LTE has completed. As described above, the UE may proceed with the call setup or give up the call setup based on whether the DB is established on the target call before the timer expires.

According to certain aspects, the techniques discussed above may also apply in the event of a handover failure or a call drop.

According to certain aspects, the techniques discuss above may also apply to a non-handover command that includes or is associated with a DB release modification. For example, the UE may initiate the timer when the non-handover message is received. As described above, the UE may proceed with the call setup or give up the call setup based on whether the DB is established on the target cell before the timer expires.

Example UE Avoidance of Handover During DB Setup

FIG. 11 is an example flow diagram illustrating example operations 1100 for DB establishment handling during a call setup procedure for LTE, in accordance with aspects of the present disclosure. The operations 1100 may be performed, for example, by a UE (e.g., UE 102). The operations 1100 may begin, at 1102, by establishing a connection with a first access point (AP) to perform a call. At 1104, the UE takes action to reduce a likelihood of receiving a message from the first AP to handover to a second AP that includes or is associated with an indication to release a dedicated bearer prior to establishment of a dedicated bearer with the first AP.

According to certain aspects, the UE can delay sending a measurement report during a call setup. This may help to avoid or reduce the likelihood of the handover procedure occurring before setup of the DB. For example, since the UE delays sending the measurement report, the MME can receive the Activate EPS bearer Complete message (e.g., from the UE) before receiving a request to handover. In aspects, the UE may delay sending the measurement report if the serving conditions (e.g., RSRP/RSRQ) satisfy (e.g., are above) a predefined threshold and/or if the difference between the serving cell conditions and target cell conditions satisfy (e.g., are below) a predefined threshold.

Another approach for the UE to avoid the issue of a handover during DB setup or modification is by adjusting the priority of one or more channels used for handover and/or bearer setup (e.g., RRC, NAS, IMS signaling channels). For example, by adjusting the priority of the channels, the UE may reduce the likelihood of intra-eNodeB/X2/S1 handover during DB setup/modification, intra-eNodeB/X2/S1 handover during DB modification, intra-eNodeB/X2/S1 handover during DB release, and/or tracking areas update (TAU) request during DB setup accept after X2/S1 handover.

Example Network Avoidance of Handover During DB Setup

FIG. 12 is an Example Flow Diagram Illustrating Example Operations 1200 for dedicated bearer establishment handling during a call setup procedure for LTE that may be performed, for example, by a network entity (e.g., an MME), in accordance with aspects of the present disclosure. The operations 1200 may begin, at 1202, by sending a request to a first access point (AP) to establish a DB for a call. At 1204, the MME receives a request from the first AP to handover a UE to a second AP. At 1206, the MME delays sending, to the second AP, the request to handover for a duration if the DB has not been established with the first AP.

According to certain aspects, the MME receives the handover request from the source eNB, but the MME has not received the indication that activation/modification of the DB is complete, then the MME may delay sending (e.g., rather than immediately sending) the handover request to the target cell during call setup. For example, the MME may start an internal timer (e.g., around 200 ms). If the DB setup or modification is completed during the delay (e.g., before expiry of the timer), then the MME may forward the handover request to the target cell, transferring the DB, along with the SRBs and default bearers, to the target cell. If the DB setup or modification is not completed (e.g., or the MME is not aware of the completion) before the timer expires, then the MME proceeds to send the handover request message to the target cell, but the handover request does not indicate and/or transfer the DB to the target cell.

According to certain aspects, the length of the timer may be configurable. For example, the timer length can be adjusted based on the handover type such as whether the handover is intra-LTE, intra-frequency or inter-frequency, or inter-RAT.

Another approach for the network to avoid the issue of a handover during DB setup/modification during and/or after call setup or service, is by adjusting the priority of one or more respective channels used for handover and/or bearer setup/modification (e.g., AS, NAS, IMS signaling channels). For example, by adjusting the priority of the one or more channels, the UE may reduce the likelihood of intra-eNodeB/X2/S1 handover during DB setup, intra-eNodeB/X2/S1 handover during DB modification, intra-eNodeB/X2/S1 handover during DB release, and/or tracking areas update (TAU) request during DB setup accept after X2/S1 handover.

According to certain aspects, the techniques described herein may apply to at least MO calls, MT calls, voice calls, video telephony calls, or VoLTE calls.

The techniques described above for DB release/modification during or after call setup for LTE may help the UE to avoid giving up the call setup or dropping the call which may be degrade user experience.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for establishing, means for delaying, means for allowing, means for taking action, means for giving up, means for maintaining, and/or means for adjusting, may comprise a processing system, which may include one or more processors, such as the TX processor 616, transmitter(s) 618, and/or the controller/processor 675 of the wireless base station 610 illustrated in FIG. 6, and/or the TX processor 668, the transmitter(s) 654, and/or the controller/processor 659 of the user equipment 650 illustrated in FIG. 6. Means for transmitting and/or means for sending may comprise a transmitter, which may include TX processor 616, transmitter(s) 618, and/or the antenna(s) 620 of the wireless base station 610 illustrated in FIG. 6, and/or the TX processor 668, the transmitter(s) 654, and/or the antenna(s) 652 of the user equipment 650 illustrated in FIG. 6. Means for receiving may comprise a receiver, which may include RX processor 670, receiver(s) 618, and/or the antenna(s) 620 of the wireless base station 610 illustrated in FIG. 6, and/or the RX processor 656, the receiver(s) 654, and/or the antenna(s) 652 of the user equipment 650 illustrated in FIG. 6. In aspects, such means for may include corresponding components of a network entity, such as an MME.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless node (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a wireless node and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless node and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   establishing a connection with a first access point (AP) to perform a call setup procedure for a call;
   receiving from the first AP a message associated with handover to a second AP;
   delaying giving up the call setup procedure for a duration if the message includes or is associated with an indication to release a dedicated bearer; and
   allowing establishment of a dedicated bearer with the second AP during the duration.

2. The method of claim 1, wherein delaying giving up the call setup procedure for the duration comprises at least one of:
   maintaining the call setup procedure if the dedicated bearer is successfully established with the second AP during the duration; or
   giving up the call setup procedure if the dedicated bearer is not established with the second AP during the duration.

3. The method of claim 1, wherein the duration is based on a timer.

4. The method of claim 3, wherein a length of the timer is based on at least one of: a type of the handover, one or more channel conditions at the first AP, or a difference between the one or more channel conditions at the first AP and one or more channel conditions at the second AP.

5. The method of claim 1, wherein the call comprises a voice call, a video telephony (VT) call, or a voice over long term evolution (VoLTE) call.

6. The method of claim 1, wherein giving up the call setup procedure comprises at least one of: sending an IP multimedia subsystem (IMS) cancel message if the call is a mobile originated (MO) call, or sending an IMS failure message if the call is a mobile terminated (MT) call.

7. The method of claim 1, further comprising:
   receiving another message from the first AP; and
   delaying giving up the call setup procedure for a duration if the message includes or is associated with an indication of a dedicated bearer release or a dedicated bearer modification.

8. The method of claim 1, further comprising:
   delaying sending a measurement report if one or more channel conditions at the first AP satisfy a first threshold or if a difference between the one or more channel conditions at the first AP and one or more channel conditions at the second AP satisfy a second threshold to reduce a likelihood of receiving the message associated with handover prior to establishment of a dedicated bearer with the first AP.

9. The method of claim 1, further comprising:
   during or after establishment of the connection with the first AP, adjusting a priority of one or more channels used for at least one of: a message related to a Measurement Report or a message related to a signaling or default bearer setup to reduce a likelihood of receiving the message associated with handover prior to establishment of a dedicated bearer with the first AP.

10. A method for wireless communications by a network entity, comprising:
    sending a request to a first access point (AP) to establish a dedicated bearer for a call;
    receiving a request from the first AP to handover a user equipment (UE) to a second AP; and
    delaying sending, to the second AP, the request to handover for a duration if the dedicated bearer has not been established with the first AP.

11. The method of claim 10, wherein delaying sending, to the second AP, the request to handover for the duration, comprises at least one of:
    sending, to the second AP, the request to handover if a message is received during the duration indicating that the dedicated bearer is successfully established with the first AP, wherein sending the request to handover comprises including or associating with the sending of the request an indication of the successful dedicated bearer establishment; or
    sending, to the second AP, the request to handover without a dedicated bearer if the dedicated bearer is not successfully established during the duration.

12. The method of claim 10, wherein the duration is based on a timer.

13. The method of claim 12, wherein a length of the timer is based on a type of the requested handover.

14. The method of claim 10, wherein the call comprises a voice, video telephony, or voice over long term evolution call.

15. The method of claim 10, further comprising:
    during establishment of the dedicated bearer with the first AP, adjusting a priority of one or more channels used for at least one of: a message related to handover or a message related to a signaling or default bearer setup to reduce a likelihood of receiving the request to handover prior to establishment of the dedicated bearer.

16. The method of claim 10, further comprising:
    after establishment of the connection with the first AP, adjusting a priority of one or more channels used for at least one of: a message related to measurement report, a message related to a handover, a message related to bearer setup, a message related to a bearer modification, or a message related to a bearer release to reduce a likelihood of receiving the request to handover prior to the completion of establishment of the dedicated bearer.

17. The method of claim 10, wherein the network entity comprises a mobile management entity (MME).

18. A method for wireless communications by a user equipment (UE), comprising:
    establishing a connection with a first access point (AP) to perform a call; and
    taking action to reduce a likelihood of receiving from the first AP a message associated with handover to a second AP that includes or is associated with an indication to release a dedicated bearer prior to establishment of a dedicated bearer with the first AP.

19. The method of claim 18, wherein the taking action comprises:

delaying sending a measurement report if one or more channel conditions at the first AP satisfy a first threshold or if a difference between the one or more channel conditions at the first AP and one or more channel conditions at the second AP satisfy a second threshold.

20. The method of claim 18, wherein the taking action comprises:
during or after establishment of the connection with the first AP, adjusting a priority of one or more channels used for at least one of: a message related to a Measurement Report or a message related to a signaling or default bearer setup.

21. The method of claim 18, wherein the call comprises a voice call, a video telephony (VT) call, or a voice over long term evolution (VoLTE) call.

22. An apparatus for wireless communications by a user equipment (UE), comprising:
means for establishing a connection with a first access point (AP) to perform a call setup procedure for a call;
means for receiving from the first AP a message associated with handover to a second AP;
means for delaying giving up the call setup procedure for a duration if the message includes or is associated with an indication to release a dedicated bearer; and
means for allowing establishment of a dedicated bearer with the second AP during the duration.

23. The apparatus of claim 22, wherein the means for delaying giving up the call setup procedure for the duration comprises at least one of:
means for maintaining the call setup procedure if the dedicated bearer is successfully established with the second AP during the duration; or
means for giving up the call setup procedure if the dedicated bearer is not established with the second AP during the duration.

24. The apparatus of claim 22, wherein the duration is based on a timer.

25. The apparatus of claim 24, wherein a length of the timer is based on at least one of: a type of the handover, one or more channel conditions at the first AP, or a difference between the one or more channel conditions at the first AP and one or more channel conditions at the second AP.

26. The apparatus of claim 22, wherein the call comprises a voice call, a video telephony (VT) call, or a voice over long term evolution (VoLTE) call.

27. The apparatus of claim 22, wherein the means for giving up the call setup procedure comprises at least one of:
means for sending an IP multimedia subsystem (IMS) cancel message if the call is a mobile originated (MO) call, or
means for sending an IMS failure message if the call is a mobile terminated (MT) call.

28. The apparatus of claim 22, further comprising:
means for receiving another message from the first AP; and
means for delaying giving up the call setup procedure for a duration if the message includes or is associated with an indication of a dedicated bearer release or a dedicated bearer modification.

29. The apparatus of claim 22, further comprising:
means for delaying sending a measurement report if one or more channel conditions at the first AP satisfy a first threshold or if a difference between the one or more channel conditions at the first AP and one or more channel conditions at the second AP satisfy a second threshold to reduce a likelihood of receiving the message associated with handover prior to establishment of a dedicated bearer with the first AP.

30. The apparatus of claim 22, further comprising:
means for, during or after establishment of the connection with the first AP, adjusting a priority of one or more channels used for at least one of: a message related to a Measurement Report or a message related to a signaling or default bearer setup to reduce a likelihood of receiving the message associated with handover prior to establishment of the dedicated bearer with the first AP.

* * * * *